Dec. 21, 1965     A. F. BLEIWEISS ETAL     3,225,165
2-VANE VOLTAGE COMPENSATED SHUNT FLASHER
Filed Aug. 17, 1962

INVENTORS
Arthur F. Bleiweiss
George Colombo
Boris Orlov
John B. Dickson
Blum, Moscovitz, Friedman and Blum
BY
ATTORNEYS United States Patent Office 3,225,165
Patented Dec. 21, 1965

3,225,165
2-VANE VOLTAGE COMPENSATED
SHUNT FLASHER
Arthur F. Bleiweiss, Great Neck, George Colombo, East Rockaway, John B. Dickson, Kew Gardens, and Boris Orlov, Woodhaven, N.Y., assignors to Signal-Stat Corporation, Brooklyn, N.Y., a corporation of New York
Filed Aug. 17, 1962, Ser. No. 217,647
7 Claims. (Cl. 200—122)

This invention relates to thermomotive flashers or circuit breakers and, more particularly, to such a flasher or circuit breaker incorporating novel voltage compensating means effective to modulate the circuit constants of the flasher or circuit breaker in accordance with changes in operating voltage or ambient temperature or both.

Flashers and automatic circuit breakers are commonly used in automotive vehicles for flashing signaling lamps, such as turn signal lamps, flare lamps, and the like. The flashers so used in automotive applications generally are thermomotive flashers of either the series, or current-operated, type, or the shunt, or voltage-operated, type. While thermomotive actuated automotive vehicle flashers are simpler and much less expensive than other types of flashers, such as, for example, motor driven commutators, they have the disadvantage of being very sensitive to changes in operating voltage, these changes affecting the cycling rates of the flashers, and sometimes the on-off time ratios thereof.

As will be appreciated by those skilled in the art, voltage fluctuations are characteristic of the electrical systems of automotive vehicles, which generally comprise a battery and a generator connected in parallel, with the voltage varying within limits even though voltage regulation is employed with the generator. For example, a nominal twelve-volt automotive vehicle electrical system may vary from eleven volts to about fifteen volts. This is a substantial percentage variation in the nominal voltage supply, and results in a correspondingly very substantial change in the operating characteristics of thermomotive flashers.

Part of the reason for the variation in performance of thermomotive flashers with variations in operating voltage is the fact that the heating rate of the operating element of a thermomotive flasher is a function of the voltage drop across the flasher.

In the case of the aforementioned voltage or shunt type flasher, the heating circuit for the operating element is connected in parallel with the load circuit controlling contacts of the flasher, and the latter are normally open. Thus, when the circuit is energized, the load current will flow entirely through the operating element heating circuit and the resistance drop thereacross is such that there is an insufficient voltage drop across the usual incandescent signal lamps to effectively illuminate the latter. As the operating element is heated to a point where it has expanded by a predetermined amount, the contacts are snapped closed, effectively shorting the operating element heating circuit and allowing substantially the full applied voltage to be effective upon the signal lamps which thereupon become effectively illuminated. During this period, the operating element cools and contracts and, after a predetermined contraction, snaps open the flasher load carrying contacts, and the cycle repeats.

Thus, the heating circuit of the operating element of a shunt type flasher is subjected, during heating of the operating element, to at least part of the potential applied across the circuit in which the flasher is connected, so that the voltage drop across such heating circuit will vary with the voltage applied across the flasher. As a result, the rate of expansion of the operating element will vary with the applied voltage.

The foregoing will be clear when it is considered that the input heating energy (W) required to expand the operating element of a shunt flasher by a pre-set amount is equal to the product of the voltage drop (E) across the operating element, current (I) therethrough and time (T), or, expressed as an equation:

$$W = EIT$$

As the factor (W) remains constant, the time (T) will vary inversely with any variation in either (E) or (I) with the other of these latter two factors remaining constant, or will vary inversely with the product (EI) if both (E) and (I) vary concurrently.

The voltage drop across a shunt flasher, when the contacts are open, is impressed substantially entirely across the heating circuit of the operating element thereof. However, even if the heating circuit is not subjected to the full applied voltage, but only to a fraction thereof, the percentage change in the voltage drop across the heating circuit of the operating element will be substantially equal to the percentage change in the voltage applied across the flasher terminals.

The signal lamps used are incandescent lamps, and the filaments of these lamps have a very high hot to cold ratio of resistance. As a result of this, while the resistance of the signal lamps varies substantially with the current flow therethrough, the resistance across the shunt flasher is substantially stable for all practical purposes. However, both the drop across the shunt flasher and the current flow through the flasher vary with the applied voltage and, with (W) remaining constant, the operating time (T) will vary inversely with applied voltage. This means that the cycling rate of the flasher varies, and the on-time ratio also varies, as the operating voltage changes.

This is unsatisfactory for automotive vehicle operation as it has been found, by experience, that the most effective signal is provided when the flashing rate is approximately 90 f.p.m. with an on-time ratio of approximately 50%, and that when the flashing rate is outside the range of approximately 60 f.p.m. to 120 f.p.m., or the on-time ratio is outside the range of approximately 30% to 75%, the signal is generally conceded to be not easily recognizable.

To obviate or at least to ameliorate the tendency of the operating constants of shunt type thermomotive flashers to vary with variations of applied voltage, the present invention provides that at least one of the factors determining the operating characteristics of such shunt type thermomotive flashers is modulated in accordance with variations in the voltage drop across the flasher, such modulation being effected by effectively connecting a resistance in series with the heating circuit of the operating element to reduce the voltage drop across the heating circuit. This reduces the current flow through the heating circuit for the operating element and accordingly will slow the operating rate of the flasher. By effectively connecting such a resistance in series with the heating circuit of the operating element in accordance with an increase in the value of the operating voltage, the heating circuit for the operating element will act as though a voltage of a lower value were effective thereacross and, with proper selection of circuit constants, the operating rate or cycling time, and the ratio of on-time to cycle time, of the flasher can be maintained substantially constant. For example, if the nominal operating voltage of the system is twelve volts, the effective connection of a resistance in series with the heating circuit of the operating element can be made to take place at about 13.5 volts so that the normal tendency to increase the cycling rate with an increase in voltage is counteracted by virtue of the fact that a part of the voltage drop which normally would occur across the heating circuit of the operating element now takes place across the series resistance so that the actual voltage drop across the heating circuit of the operating element is reduced to a value lower than would otherwise correspond to the increased value of the operating voltage. Thereby, the heating circuit of the operating element "sees" a current of a value corresponding to a lower operating voltage, such as the nominal twelve volts, for example.

In somewhat more detail, the particular modulating means of the present invention includes a snap action electrically conductive metal vane having an operating element in the form of a high resistance electrically conductive pull element secured thereto, and which is of the general type shown in Welsh U.S. Patent No. 2,756,304. The operating element has the characteristic of a a high rate of expansion per degree rise in temperature, and has a heating winding wound thereon. This heating winding is subjected to substantially the full operating potential applied across the flasher, and is arranged to effect snapping of the vane between two positions. The vane carries a movable contact which is operatively associated with a relatively fixed contact, and these two contacts control the connection of a resistance into effective series relation with the heating circuit for the operating element of the flasher when the operating voltage exceeds a predetermined value. When the operating voltage does exceed such predetermined value, this resistance is connected in effective series relation with the heating circuit of the operating element of the flasher so that the latter "sees" a lower voltage, such as a nominal voltage of 12.0 volts, and accordingly operates the flasher at a rate and an on-time ratio corresponding to such nominal value.

For an understanding of the principles of the invention, reference is made to the following description of typical embodiments thereof as illustrated in the accompanying drawings. In the drawings.

Figure 1:
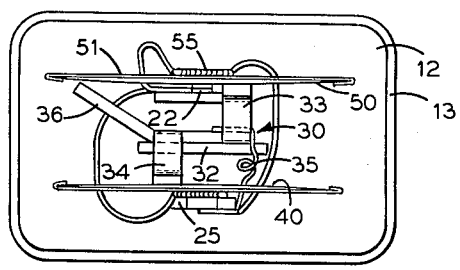
FIG. 1 is a top plan view, with the cover removed, of a shunt type flasher embodying the invention.
Figure 2:
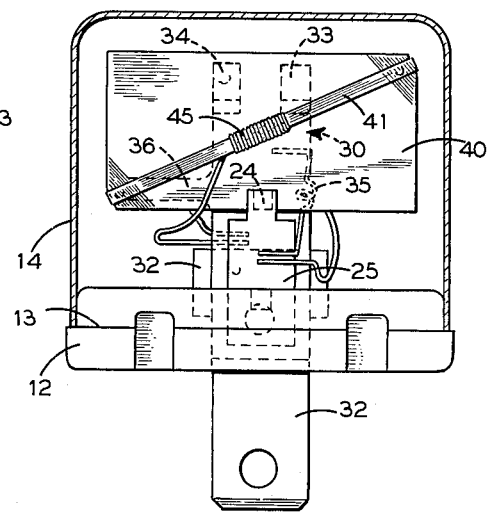
FIG. 2 is a front elevational view of this flasher, the cover being shown in section.
Figure 3:
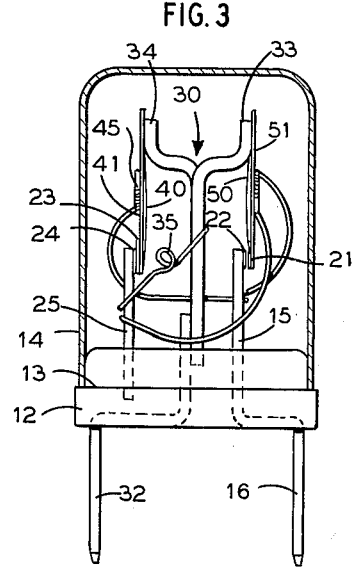
FIG. 3 is a right end elevational view of this flasher, the cover again being shown in section.
Figure 4:
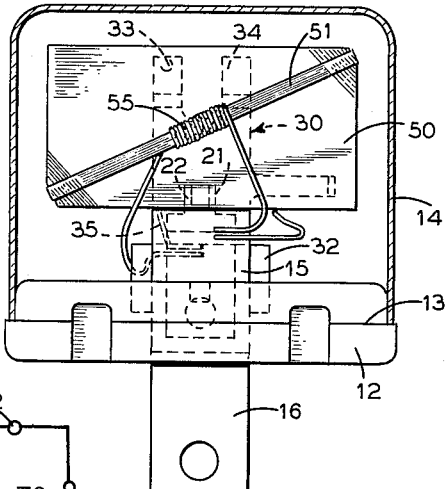
FIG. 4 is a rear elevational view of this flasher, the cover again being shown in section.

Referring to FIGS. 1 through 5, the principal operating components of the flasher are a snap action, preferably electrically conductive metal, main vane 50 to which is attached a pull ribbon 51, of thermally expansible and preferably electrically conductive metal, and which is indirectly heated by a high electrical resistance winding 55 wound thereon. As set forth in said Welsh patent, vane 50 is formed with linearly extending aligned and spaced pre-set deformations which extend diagonally thereacross and provide an initial bending line about which the vane is bent in its "restored" position. At the ends of this diagonal, the corners of the vane are bent out of the general plane of main vane 50 and the opposite ends of pull ribbon 51 are permanently secured thereto as by welding, soldering, brazing, or the like. Pull ribbon 51 is secured to vane 50 in the cold contracted condition of the pull ribbon and while the vane is bent about another bend line extending at an angle to the deformations so that the vane, with pull ribbon 51 attached thereto, is bent about this other bend line in a "stress-deformed" condition and stores potential energy in the vane so that the latter tends always to snap back to the "restored" position as soon as the tension, holding it in the "stress-deformed" condition, is released.

As the temperature of pull ribbon 51 increases, due to the heat input therethrough from the flow of electric current through the heating winding 55, the pull ribbon expands and, after a predetermined expansion of the pull ribbon, the potential energy in vane 50 overcomes the holding force of the pull ribbon and vane 50 snaps to its restored position in which it is bent about the linear deformations. As pull ribbon 51 cools and contracts, it snaps vane 50 back to the stress-deformed condition in which it is bent about a line extending about an angle to the deformations. As further explained in said Welsh patent, when vane 50 is fixedly supported at a zone or point spaced laterally of the bend line defined by the linear deformations, a movable portion of the vane will have a relatively high amplitude of movement when the vane is alternately snapped between its "restored" and "stress-deformed" positions.

The flasher operating elements are supported upon a dielectric base 12 which, in the form illustrated, is substantially rectangular with rounded corners and has a ledge 13 extending therearound. This ledge 13 serves to seat a metal casing or cover 14 for the flasher. However, it should be understood that, while a substantially rectangular base is illustrated, the base could have any other configuration in plan without departing from the scope of the invention.

Three generally upright support brackets, of electrically conductive metal, extend upwardly from base 12. Bracket 15 is preferably integral with a prong 16 molded through the base 12, and the free end thereof carries a contact 22 which is normally disengaged with a contact 21 on vane 50. Contacts 21 and 22 are normally open and are the load current carrying contacts of the flasher.

Bracket 30 has an essentially straight upright section extending somewhat into base 12, and the lower end of this upright section is braded, welded, soldered, or otherwise mechanically and electrically connected to the upper end of a prong 32 molded through base 12. The upper end of bracket 30 is forked to provide two arms 33 and 34 off-set outwardly in opposite directions and spaced substantially equi-distant laterally from the vertical center line of bracket 30. Off-set arm 33 is welded, brazed, soldered, riveted, or otherwise anchored to vane 50 at a point substantially laterally of the line of deformations therein. Arm 34 is anchored to the auxiliary vane 40 at a point spaced laterally of the linear deformations therein, vane 40 being substantially identical with vane 50 including the longitudinally spaced linear deformations and the bent corners to which are secured the opposite ends of a pull ribbon 41 of heat expansible and preferably electrically conductive metal.

Bracket 15 and prong 16, on the one hand, and bracket 30 and prong 32, on the other hand, form a pair of electrically conductive means adapted to be connected electrically to a lamp and source of operating potential, respectively.

A third bracket 25 has its lower end molded into base 12 intermediate the ends thereof, and extends upwardly adjacent the outer surface of vane 40. The free end of bracket 25 carries a contact 24 normally engaged with a contact 23 secured on the vane 40 and movable therewith. Contacts 23 and 24 are thus normally closed.

One end of heating winding 55 of pull ribbon 51 is electrically connected to bracket 15, and the other end of winding 55 is electrically connected to bracket 25. Pull ribbon 41 of vane 40 is indirectly heated by a high electrical resistance winding 45 which is wound thereon, preferably along its midsection, and has one end electrically and mechanically connected to bracket 15, and the opposite end electrically and mechanically connected to pull ribbon 41.

A resistor 35, in the form of a strip of high electric resistance metal, and which is preferably looped intermediate its ends to provide flexibility for expansion, has one end electrically and mechanically connected to support bracket 30 and the other end thereof mechanically and electrically connected to bracket 25.

Figure 5:
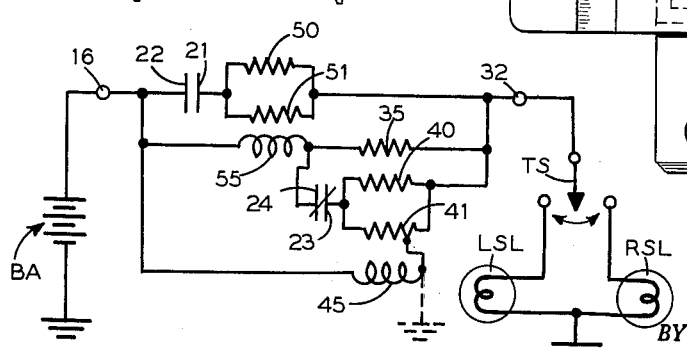
FIG. 5 is a schematic wiring diagram of the flasher shown in FIGS. 1–4.

The operation of the flasher shown in Figs. 1 through 4 will be understood best by reference to Fig. 5, which is a schematic wiring diagram of the flasher. A source of operating potential, indicated as a battery BA, has one terminal grounded and the other terminal connected to lug or prong 16 of the flasher. Battery BA represents the usual automotive source of electric powers such as, for example, a twelve-volt battery-generator system. Lug or prong 32 of the flasher is illustrated as connected through a turn signal switch TS to either of a pair of lamps LSL or RSL, representing the left and right turn signal lamps of a vehicle. Switch TS is illustrated as in the neutral position, and is selectively engageable with either of a pair of terminals depending upon which type of turn or direction is to be signaled. For a better understanding of the electric theory involved, in Fig. 5 vane 50 and pull ribbon 51 are illustrated as a pair of parallel resistances, and vane 40 and pull ribbon 41 are illustrated as a second pair of parallel resistances.

The load circuit controlling and load current carrying contacts 21 and 22 are normally open so that, upon closure of the switch TS in either direction, the potential of the source is impressed across heating winding 55. Resistor 35 is connected in parallel with contacts 23 and 24 which are normally closed so that resistor 35 is normally shunted. Contacts 23 and 24 are illustrated as connected in series with the parallel resistance combination 40 and 41.

Upon closure of switch TS in either direction, the source of potential is impressed across heating winding 55 so that the latter heats pull ribbon 51 whereby the pull ribbon will expand and, after a predetermined expansion, will permit vane 50 to snap from the stress-deformed condition to the restored condition and thus to close contacts 21 and 22. The load current now flows through the parallel combination of vane 50 and pull ribbon 51 to lug 32 and thus to the load, such as lamp LSL or lamp RSL. Winding 55 is effectively shunted, so that heating of pull ribbon 51 is interrupted and the latter cools and contracts eventually to snap vane 50 back to the stress-deformed condition in which contacts 21 and 22 are open and the potential of the source is again applied across heating winding 55. The flasher thus cyclically opens and closes load current carrying contacts 21 and 22 which, together with vane 50, pull ribbon 51, and winding 55, form a cyclically operable circuit opening and closing means.

If the operating potential should increase above the nominal value, such as 12 volts, the heating effect of winding 45, which is, in effect, connected across source BA, will be sufficient to cause expansion of pull ribbon 41 by an amount adequate to snap vane 40 from the stress-deformed condition to its restored condition and thus to open contacts 23 and 24. This cuts resistance 35 into series with heating winding 55 so that the effective operating potential applied across heating winding 55 is thereby reduced to a value corresponding substantially to such nominal operating potential. Consequently, the cycling rate of the flasher is thereby maintained at a value corresponding to that pertinent to the normal operating potential of approximately 12 volts, and the ratio of the on-time of the flasher to the cycle time is also maintained at the value pertinent to the nominal operating potential of approximately 12 volts. It is to be noted that the winding 45 responds only to an increase in the operating potential to act on the pull ribbon 41 to cause the vane 40 to snap from its stress-deformed condition to its restored condition so as to open the contacts 23 and 24 and thus cut the resistance 35 into series with the winding 55. Thus, the structure of the invention will respond only to an increase in the operating potential to connect the resistance 35 to the winding 55. In automotive vehicles where the structure of the invention will be used, there is a great possibility of a considerable rise in the ambient temperature which could cause structures which respond to such rises to produce an unreliable operation. For example, if a bimetallic strip is relied upon, such a strip, while it could be heated by a coil such as the winding 45 nevertheless responds to the ambient temperature and might with a sufficiently great increase in the ambient temperature cause the circuit to operate improperly or it might under certain circumstances produce a result such as the cutting in of the resistance 35 without an increase in the operating potential which is great enough to call for such a cutting in of the resistance 35. With the structure of the invention, however, the heating of the pull ribbon 41 by the coil 45 is derived solely from the operating potential so that the structure of the invention is substantially insensitive to fluctuations in ambient temperature and therefore will control the flashing operations solely in accordance with variations in the operating potential.

It will be appreciated that heating winding 45 could be connected directly across the source BA, with one end grounded as shown in broken lines, and its connection to pull ribbon 41 removed. This would effectively eliminate pull ribbon 41 from the electrical circuit, but the arrangement would otherwise operate exactly in the same manner as shown in full lines and as just described.

While a specific embodiment of the invention has been described in detail to illustrate the application of the principles of the invention, it will be understood that the invention may be embodied otherwise without departing from such principles.

What is claimed is:

1. A flasher for use between a source of operating potential and a lamp, said flasher comprising at least part of an electrical circuit between said source and said lamp, and including a pair of contacts which, when they engage each other, complete the circuit between said source and lamp to energize the latter, one of said contacts being permanently in electrical connection with said source of operating potential, a vane carrying the other of said contacts and movable between a stress-deformed condition and a restored condition, said vane when in said restored condition placing said other contact in engagement with said one contact to energize said lamp, a pull ribbon connected to said vane for maintaining the latter in said stress-deformed condition when said pull ribbon is cold, and a winding surrounding said ribbon and connected in parallel with said pair of contacts for heating said pull ribbon to expand the latter so that said vane will snap into said restored condition thereof to energize said lamp and to terminate heating of said ribbon by said winding so that said ribbon will cool to return said vane to said stress-deformed condition and move said other contact away from said one contact to deenergize said lamp, whereby said lamp will flash during normal operations, and further including a resistor in series with said winding across said contacts, and means including a shunt circuit connected in parallel with said resistor and responding solely to a given increase in the operating potential of said source above a given operating potential for opening said shunt circuit to electrically place said resistor in series with said winding to maintain the operation of the flasher substantially unchanged when the operating potential of said source increases undesirably above said given potential, said means being substantially insensitive to fluctuations in ambient temperature.

2. A flasher for use between a source of operating potential and a lamp, said flasher comprising at least part of an electrical circuit between said source and lamp, and including a pair of contacts which close said circuit to energize said lamp when said contacts engage each other, one of said contacts being permanently connected with said source of potential, a snap vane carrying the other of said contacts and being movable between a stress-deformed condition and a restored condition, said vane placing said other contact in engagement with said one contact when said vane is in said restored condition thereof, a pull ribbon fixed to said vane and maintaining the latter in said stress-deformed condition thereof when said pull ribbon is cold, a winding connected in parallel with said contacts and surrounding said pull ribbon to heat the latter so as to expand said pull ribbon until said vane snaps to said restored condition thereof thus energizing said lamp and terminating the heating of said ribbon by said winding, whereupon said ribbon cools to restore said vane to said stress-deformed condition thereof to separate said contacts and open the circuit to deenergize said lamp, whereby said lamp will flash during normal operations, and further including a resistor connected in series with said winding, a shunt circuit also connected in series with said winding, said shunt circuit being connected in parallel with said resistor and including a second pair of contacts which normally engage each other to close said shunt circuit and prevent electrical connection of said resistor to said winding, and means operatively connected to said second pair of contacts and adapted to be connected to said source of operating potential for separating said second pair of contacts from each other when the source of operating potential has an increase in its operating potential of a given amount above a given operating potential, whereby said resistor will then be connected in series with said winding to maintain the operation of the flasher substantially unchanged, said means being substantially insensitive to fluctuations in ambient temperature.

3. A flasher as recited in claim 2 and wherein said means includes a second snap vane carrying one of said second pair of contacts and also movable between a stress-deformed condition and a restored condition, said second vane maintaining said second pair of contacts in engagement with each other when said second vane is in said stress-deformed condition thereof, a second pull ribbon fixed to said second vane, and a second winding surrounding said second pull ribbon and adapted to be connected to said source of operating potential for heating said second pull ribbon to an extent sufficient to release said second vane for movement to said restored condition thereof, thus separating said second pair of contacts, only when the potential of said source exceeds said given operating potential by said given amount.

4. A flasher for use between a source of operating potential and a lamp, said flasher comprising cyclically operable circuit opening and closing means for cyclically opening and closing a circuit between said source and lamp and including a winding alternately connected into and cut out of said circuit during operation of said circuit opening and closing means, a resistor in series with said winding to compensate for an increase in the operating potential of said source, a pair of contacts connected in parallel with said resistor to form at least part of a circuit shunting said resistor when said contacts engage each other and operatively connecting said resistor to said winding when said contacts are separated, one of said contacts being stationary and the other being movable, a snap vane carrying said movable contact and having a stress-deformed condition locating said movable contact in engagement with said stationary contact and a restored condition separating said movable contact from said stationary contact, a pull ribbon connected to said vane and, when cold, maintaining said vane in said stress-deformed condition, said ribbon when heated to a given extent releasing said vane for movement to said restored condition thereof, and a second winding surrounding said ribbon and adapted to be connected to said source for heating said ribbon to said given extent only when the operating potential of said source rises by a given amount above a given operating potential.

5. A flasher as recited in claim 4 and wherein said second winding is connected to said pull ribbon.

6. A flasher as recited in claim 4 and wherein said second winding is grounded.

7. A flasher comprising a pair of electrically conductive means adapted to be connected electrically to a lamp and a source of operating potential, respectively, a pair of snap vanes carried by one of said electrically conductive means and each being movable between a stress-deformed condition and a restored condition, a pair of pull ribbons respectively connected to said vanes for maintaining them in said stress-deformed condition when said ribbons are cold and for releasing said vanes for movement to said restored condition thereof when said ribbons are heated to a given extent, a pair of windings respectively surrounding said ribbons for heating them when said windings are energized, a pair of movable contacts carried by said vanes for movement therewith, a pair of stationary contacts respectively located in the paths of movement of said movable contacts, one of said stationary contacts being carried by the other of said electrically conductive means and being engaged by one of said movable contacts when the vane carrying said one movable contact is in its restored condition, the other stationary contact being engaged by the other movable contact when the vane carrying said other movable contact is in its stress-deformed condition, the winding which surrounds the pull ribbon connected to the vane which carries said one movable contact being electrically connected between said stationary contacts, a resistor connected in series with the latter winding and said one electrically conductive means, the other winding being connected electrically between said pair of electrically conductive means and heating the pull ribbon which it surrounds to release the vane carrying the latter pull ribbon for movement to its restored condition only when the operating potential exceeds a given operating potential by a given amount, whereby said other movable contact will then move away from said other stationary contact to cut said resistor into the circuit to compensate for the increase in operating potential.

References Cited by the Examiner
UNITED STATES PATENTS

| | | | |
|---|---|---|---|
| 2,610,283 | 9/1952 | Kolisch | 200—138 |
| 2,756,304 | 7/1956 | Welsh | 200—122 |
| 2,758,175 | 8/1956 | Hotchkiss | 200—122 |
| 2,842,642 | 7/1958 | Colombo et al. | 200—122 |
| 2,847,554 | 8/1958 | Huffman | 200—138 |
| 3,098,139 | 7/1963 | Bleiweiss et al. | 200—137 |

BERNARD A. GILHEANY, *Primary Examiner.*